May 26, 1936. E. A. KLIEWER 2,041,936
VEHICLE CHASSIS
Filed Dec. 8, 1934 2 Sheets-Sheet 1
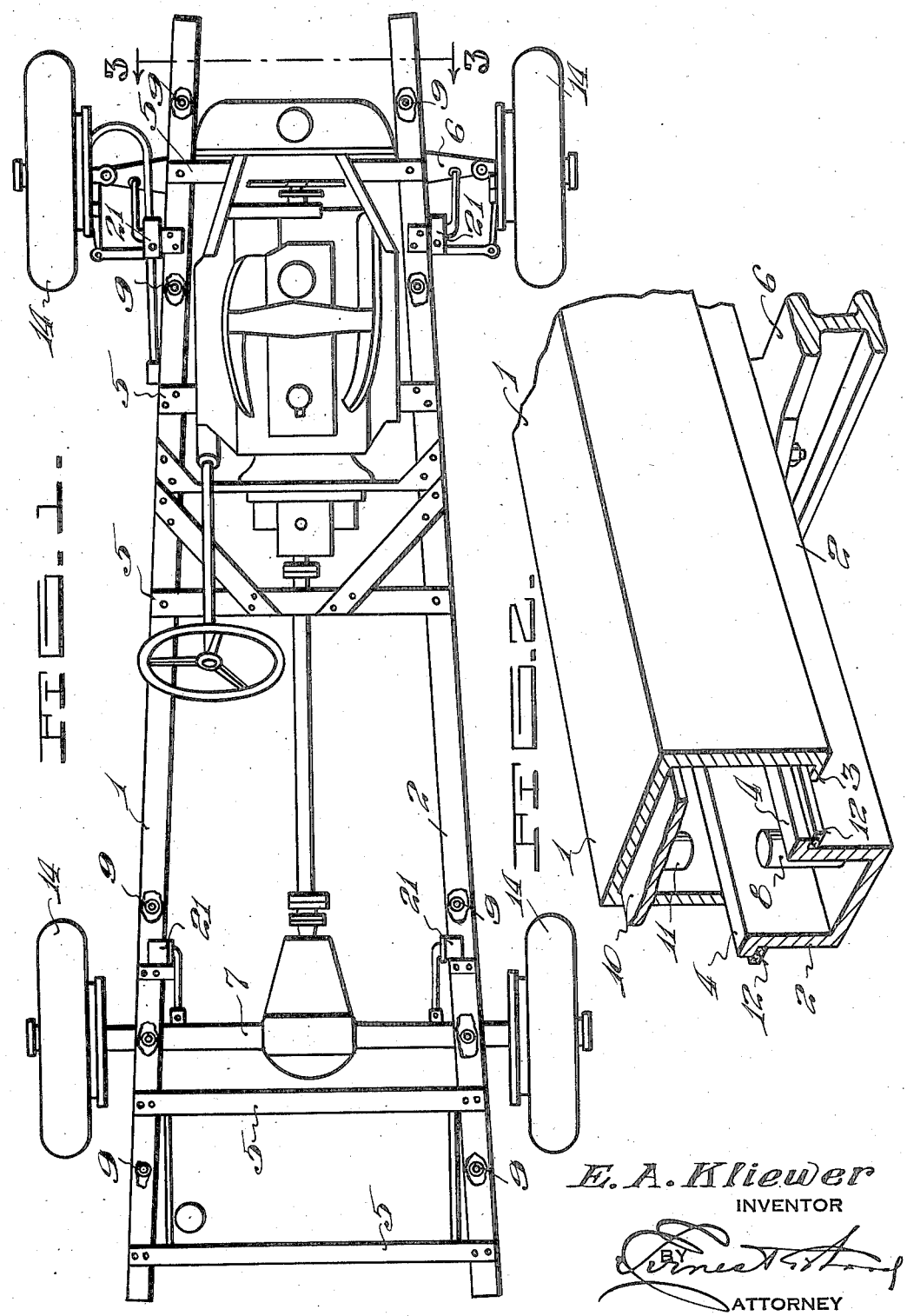
E. A. Kliewer
INVENTOR
ATTORNEY May 26, 1936.　　　E. A. KLIEWER　　　2,041,936
VEHICLE CHASSIS
Filed Dec. 8, 1934　　　2 Sheets-Sheet 2
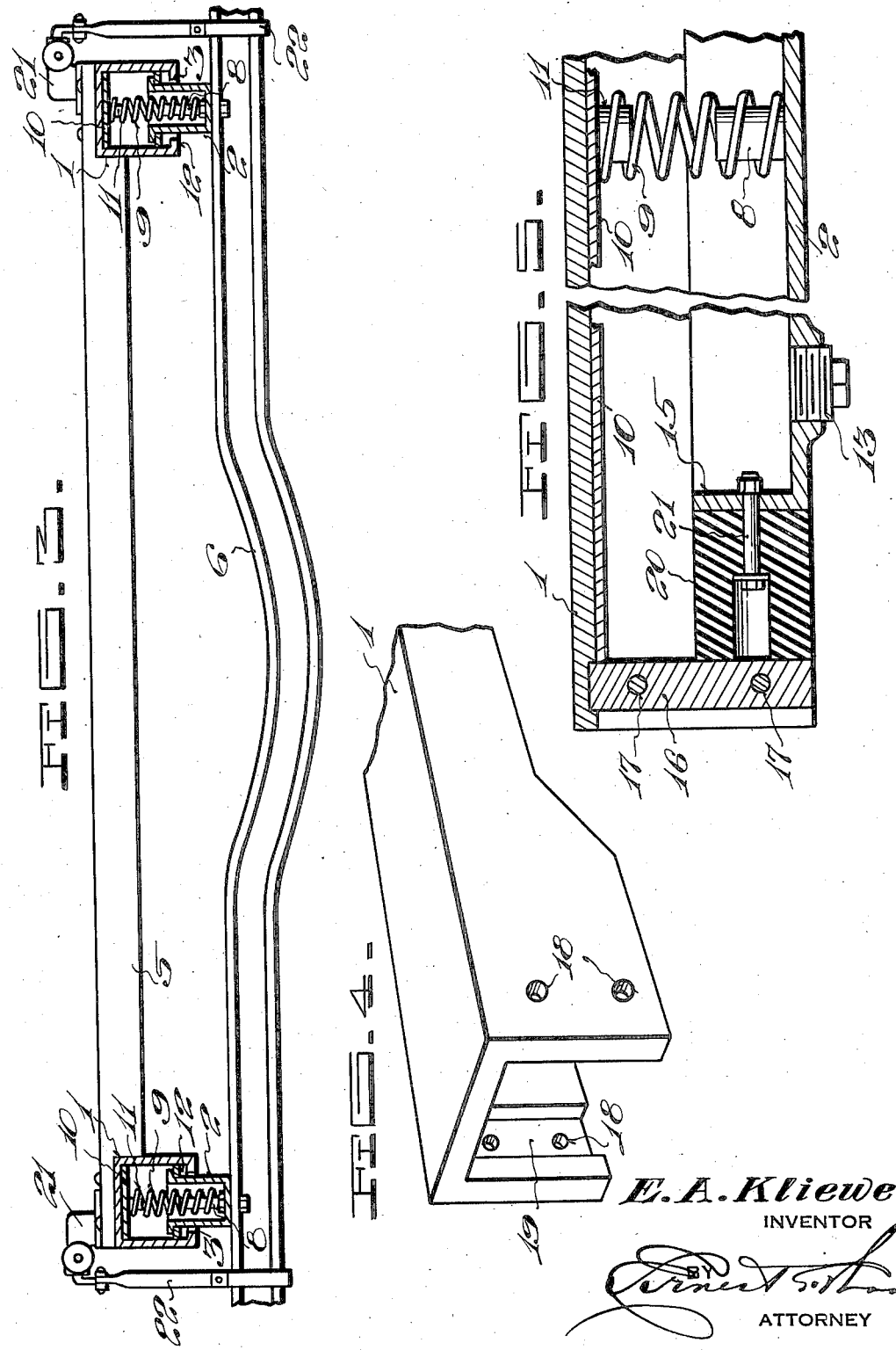
E. A. Kliewer
INVENTOR
ATTORNEY Patented May 26, 1936

2,041,936

UNITED STATES PATENT OFFICE 2,041,936

VEHICLE CHASSIS

Edward A. Kliewer, Longview, Tex., assignor of one-half to R. W. Fair, Tyler, Tex.

Application December 8, 1934, Serial No. 756,659

6 Claims. (Cl. 280—106.5)

This invention relates to automobile body construction and it has particular reference to improvements in vehicle chassis.

The principal object of the invention is to dispense with conventional types of springs whereby the body is resiliently supported upon the chassis and to substitute therefor springs which are wholly enclosed and jointly retained by elements constituting the chassis of the vehicle, one of which carries the wheels of the vehicle and the other, the body. The invention aims to thus enable each wheel of the vehicle to move independently of each other and of the body when a sudden rise or obstacle is encountered in the highway.

Heretofore, the various types of yielding wheel suspensions have been contemplated to protect the body of a vehicle against vibrations when rises and other obstacles in a highway are encountered, but as a matter of fact, the body being the greater of the mass, it is influenced by such obstacles and consequently, conventional designs of wheel suspensions and resilient body supporting structure are not wholly effective for the purpose for which they have been designed.

The present invention therefore aims to provide a vehicle chassis in sections, one of which constitutes a part of the body while the other constitutes a part of the chassis and which are adapted to be readily secured together in order that a yielding medium may be embodied therebetween.

The peculiar design of the invention is such that effective lubrication of the springs is insured at all times and further, the latter may be thoroughly cleaned when desired by the introduction of fluid under pressure.

Another object of the invention is to provide means by which to absorb the shocks of sudden starting and stopping of a vehicle, thereby to relieve the strain upon the chassis or the body or both when they are subjected to strains usually imposed upon them during normal operation.

Still another object of the invention is to provide means by which assembly of the parts, that is, the mounting of the body upon the chassis may be expedited.

With the foregoing objects as paramount, the invention has particular reference to its salient features of construction and arrangement of parts which will become manifest as the description proceeds, taken in connection with the accompanying drawings, wherein:—

Figure 1 is a plan view of a vehicle chassis comprised of the inverted channel members.

Figure 2 is a fragmentary perspective view showing the relationship of the channel members comprising the chassis.

Figure 3 is a view on lines 3—3 on Figure 1.

Figure 4 is a fragmentary end view in perspective of the upper channel member, and Figure 5 is a fragmentary view in longitudinal section showing the relationship of the channel members at their ends.

Continuing with a more detailed description of the drawings, channel members 1 are provided which correspond to the channel members 2, shown in the other figures. The channel member 1 is provided with inwardly directed, longitudinal flanges 3 which overlie similar flanges 4 of the channel member 2.

As apparent in Figure 3, cross members 5 are effective in securing the channel member 1 to the body of the vehicle which is not shown while the channel member 2 is secured directly to the front axle 6 of the chassis and the rear axle 7.

Situated at spaced intervals within the lower channel member 2 are projections 8 functioning as guides for coiled springs 9. One end of these springs rests upon the channel member 2 while the other supports the inverted channel member 1 through the medium of a strip of metal 10, which latter also has downwardly directed projections 11, likewise functioning as guides for the upper end of the spring 9.

It will be noted in Figures 2 and 3 that a strip of felt 12 or an equivalent material is secured longitudinally beneath the flanges 4 of the lower channel member 2. The free edges of these strips of felt wipingly engage the contiguous walls of the inverted channel member 1 when the relative position of the channel members are changed during operation of the vehicle. It will be understood that these strips of felt are effective in sealing the space defined by the channel members against the escape of a suitable lubricating medium confined within this space. This lubricating medium is injected through an opening in one end of each of the two chassis members which is closed by the plug 13 shown in Figure 5. A similar plug is provided at the opposite end of each of the chassis members but since it is analogous to that shown in Figure 5, it has not been considered necessary to illustrate the same in detail.

By applying a flexible connection of some character to the opening shown in Figure 5 and removing the plug from the opposite opening at the other end of the chassis member, steam or other fluid may be introduced into the chassis member under pressure, if desired, to thereby clean out foreign matter and effect drainage through the opposite opening. Thus, the members may be thoroughly cleaned at intervals to insure continuous effectiveness of the springs 9.

In assembling the combination, it being understood that the upper channel member 1 is secured to the body of the vehicle and the lower channel member 2 is secured to the chassis or wheels 14 of the vehicle, the member 1 is slid longitudinally onto the member 2 in the relationship shown in Figure 2. In order to accomplish this, one end of each of the members 1 must be open. The open ends of the members 1 are shown in Figures 4 and 5 and it will be noted that they overreach the ends of the members 2 at one end of the vehicle. The ends of the members 2 are closed as at 15, as apparent in Figure 5 while the open ends of the members 1 are closed by a plate 16, the latter being held in secure relation to the members 1 by means of bolts 17 passing through apertures 18. The plate 16 lies in a recess 19 shown in Figure 4 to insure against displacement of the plate under severe strain and a resilient body 20 of rubber or an equivalent material is secured by countersunk bolts 21 to the ends 15 of the lower channel member 2 and which body is interposed between the said end portion 15 and the plate 16 which is secured to the upper channel member 1. From the foregoing it is apparent that vertical strips imposed upon the lower channel member 2 from the wheels of the vehicle will be assumed by the springs 9 of which there may be any desired number and these springs will absorb substantially all of the shocks and vibrations to which the member 2 is subjected. This is likewise true of side strains, such for example as when a wheel or wheels on one side of the vehicle strike an obstacle or a sudden rise in the highway.

End stresses and thrusts caused by sudden starting and stopping of the vehicle and ordinarily assumed by the lower channel members 2 are assumed by the body of resilient material 20 situated between the members 2 and members 1 at their ends. These bodies 20 perform the function normally performed by conventional types of shackles carried by leaf springs ordinarily used for yieldingly supporting a vehicle body from the chassis.

In order to insure against too sudden changes in the relative positions of the members 1 and 2, a conventional type of snubber 21 is provided at either end of the members 1 and secured by any suitable means 22 to each of the axles of the vehicles 6 and 7.

It will be understood from the foregoing that in assembling the elements 1 and 2, it is necessary that the springs 9 be first collapsed as the member 1 is slid onto the member 2. This is accomplished by means of the strip 10 which is first placed upon the springs 9 and as the member 1 is advanced upon the member 2, the springs 9 are successively compressed to allow the member 1 to assume the operative position shown relative to the lower channel member 2. Afterwards, the end member or plate 16 shown in Figure 5 is disposed in the grooves 19 shown in Figure 4 and the bolts 17 placed into position. The operation described is all that is required to adapt the improved chassis for actual use.

Manifestly, the construction shown is capable of considerable modification and such modification as is considered within the scope and meaning of the appended claims is also considered within the spirit and intent of the invention.

What is claimed is:

1. In a vehicle chassis construction, a section carrying the wheels of said vehicle, a section secured to the body thereof arranged to receive said first section, resilient means interposed between said sections to absorb shocks imposed vertically upon said first section, means at either end of said sections to absorb shocks imposed longitudinally upon said sections and means for maintaining a lubricating medium within said sections.

2. In a vehicle chassis construction, a pair of confronting channeled members one of which is of greater length than the other and supporting the body of said vehicle, the other member being arranged to operatively carry the wheels of said vehicle, resilient means between the members for holding the same normally apart for vertical pressure and means to absorb shocks imposed longitudinally upon the members.

3. In a vehicle chassis construction, a pair of confronting channeled members the lower of said members being shorter than the upper member and having a fluid inlet and outlet, and arranged to carry the wheels of said vehicle, said upper member supporting the body thereof, resilient means between the members holding the same normally apart for vertical pressure, and means to absorb shocks imposed longitudinally upon the members.

4. In a vehicle chassis construction, a pair of confronting channel members of unequal length, one of which is arranged to receive a cleansing and lubricating fluid and held normally apart by shock absorbing resilient means and confined to limited vertical and longitudinal displacement relatively, and cushioning means carried by the shorter of said members to absorb longitudinal shocks imposed on said members.

5. In a vehicle chassis construction, a pair of confronting channel members of unequal length and which members are held normally apart by spaced, vertically disposed springs, and confined to limited vertical and longitudinal displacement relatively, a cushioning means connected to the shorter of said members for receiving shocks imposed longitudinally on said members, means to effect introduction of a lubricating medium between said members and means to maintain said resilient means in operative position.

6. In a vehicle chassis construction, a pair of channel members whose channels are of unequal length and confronting and which members are held normally apart by shock absorbing resilient means and confined to limited vertical and longitudinal displacement relatively, means lying within the longest of said channel members affording an abutment for said resilient means to prevent friction between the same, means to effect introduction of a lubricating medium between said members and means to maintain said resilient means in operative position.

EDWARD A. KLIEWER.